United States Patent Office 3,477,923
Patented Nov. 11, 1969

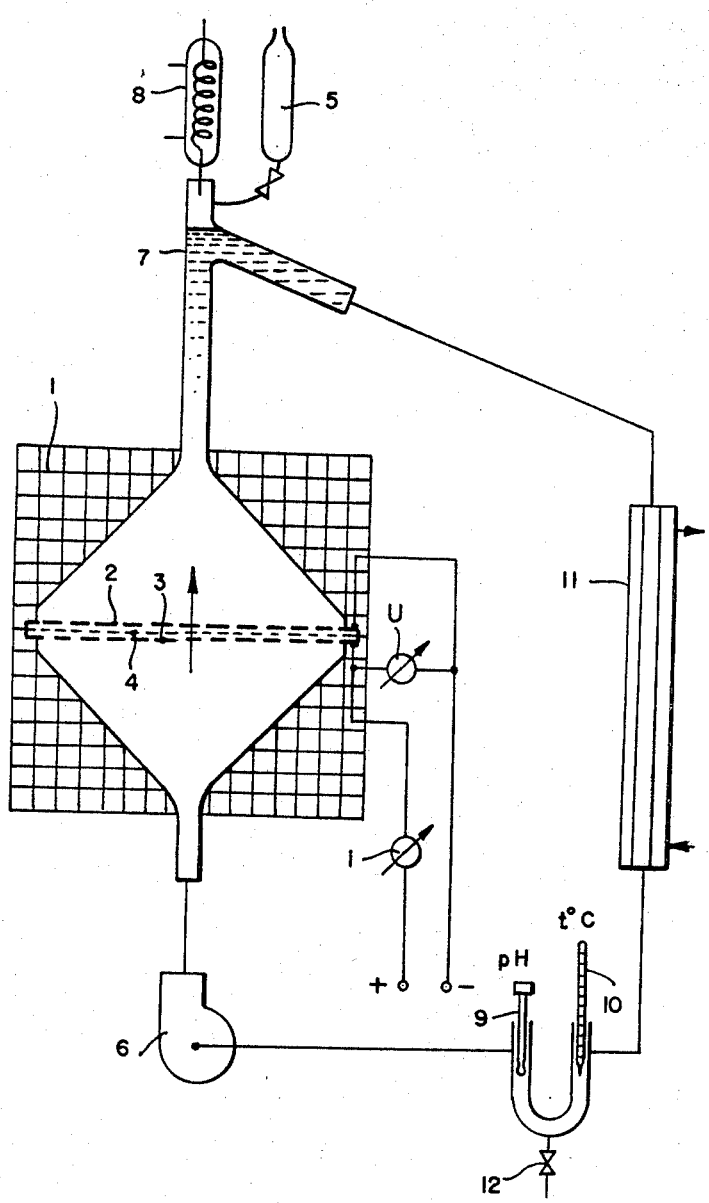

3,477,923
ELECTROCHEMICAL HYDRODIMERIZATION
OF ACRYLONITRILE
Fritz Beck, Hans Leitner, and Karl Wintersberger, Ludwigshafen (Rhine), and Harald Guthke, Frankenthal, Pfalz, Germany, assignors to Badische Anilin- & Soda-Fabrik Aktiengesellschaft, Ludwigshafen (Rhine), Rhineland-Pfalz, Germany
Filed July 8, 1966, Ser. No. 563,793
Claims priority, application Germany, July 9, 1965, 1,518,570; Jan. 13, 1966, 1,571,720
Int. Cl. B01k 1/00, 3/10
U.S. Cl. 204—73    9 Claims

ABSTRACT OF THE DISCLOSURE

An electrochemical hydrodimerization of acrylonitrile in which the aqueous reaction mixture containing acrylonitrile and a conducting salt is passed continuously in transverse direction through the macroscopic and liquid-permeable surface of at least one pair of electrodes consisting of anode and cathode members in adjacent parallel relationship and spaced at a distance of approximately 0.02 to 1 mm. The adiponitrile formed by the reaction is useful in the production of synthetic fibers.

The present invention relates to a new method of electrochemical hydrodimerization of acrylonitrile.

It is known that when a reaction mixture which contains water, a conducting salt and acrylonitrile is electrolyzed, the acrylonitrile is hydrodimerized into adiponitrile. The reaction may be carried out in an electrolytic cell in which the anode chamber and the cathode chamber are separated from each other by a partition (diaphragm)—see for example the U.S. patent specifications Nos. 3,193,480, 3,193,476, 3,193,482, 3,193,483, British patent specification No. 1,011,438 and Belgian patent specification No. 623,691. This method has a number of disadvantages. The electrolytic cell has a complicated design and can only be operated on a commercial scale with great expenditure. The diaphragm has only a limited life. Voltage losses in the anolytes, catholytes and in the diaphragm necessitate relatively high cell voltages. Losses also occur by diffusion and to some extent by transfer of monomer and conducting salt into the anode chamber. Regulation of the pH value offers difficulty, particularly when a porous diaphragm is used.

It has also been recommended in Belgian patent specification No. 649,625 that an electrolytic cell without a diaphragm should be used. However, low yields of adiponitrile are obtained in this process.

It is an object of the present invention to provide a process for the electrochemical hydrodimerization of acrylonitrile in which an electrolytic cell is used which is not of complicated design and which may be operated on an industrial scale at low expense. It is a further object of the invention to provide a process for the electrochemical hydrodimerization of acrylonitrile in which no diaphragm is used, which requires lower cell voltages, in which there are no losses of monomer and conducting salt owing to diffusion, in which control of the pH value of the electrolyte offers no difficulty and in which high yields of adiponitrile are obtained.

These and other objects are achieved in a process for the electrochemical hydrodimerization of acrylonitrile by electrolysis of a reaction mixture which contains acrylonitrile, water and a conducting salt by using at least one liquid-permeable pair of electrodes through which the reaction mixture flows transversely to the macroscopic surface of the electrodes and in which the electrodes are spaced apart at a distance of less than 1 mm.

The new process does not use diaphragms so that the electrolytic cell is of simpler design. Voltage losses are very small and lower cell voltages are therefore achieved. The concentration of conducting salt may be much less than in the prior art methods. Surprisingly losses of conducting salt by anodic oxidation are practically negligible. Working up the reaction mixture is much easier owing to the lower concentration of conducting salt.

The process may be carried out within a wide range of concentrations of acrylonitrile. In general a reaction mixture is used which contains 5 to 98% by weight, advantageously 20 to 98% by weight, and particularly 40 to 90% by weight of acrylonitrile. The reaction mixture should contain only one liquid phase. Both solutions of acrylonitrile in water and solutions of water in acrylonitrile may be used. The water content of the reaction mixture is in general from 1 to 94% by weight, preferably from 5 to 35% by weight.

As conducting salts there are used in conventional manner those whose cations have a high deposition potential. The discharge potential (reduction potential) of the cations in a 1-molar aqueous solution at a current density of 10 amperes per square decimetre should preferably be more negative than −2.0 volts (against the standard hydrogen electrode). For example salts of quaternary ammonium bases are suitable. Alkali metal salts and alkaline earth metal salts may however also be used because their discharge potential is shifted at low concentrations to negative values. As anions of these salts, those are particularly suitable which are not, or not easily, oxidizable, such as sulfates, monoalkyl sulfates, fluorides, tetrafluoborates, fluosulfonates and perchlorates. Examples of suitable conducting salts are tetraethyl ammonium ethyl sulfate, tetramethyl ammonium methyl sulfate, bis-tetraethyl ammonium sulfate, tetraethyl ammonium fluoride, triethylcarbethoxymethyl ammonium sulfate, tetramethyl ammonium fluorosulfonate, lithium sulfate, lithium perchlorate, sodium perchlorate, magnesium tetrafluoborate and barium p-toluene-sulfonate. Since tetraalkyl ammonium salts increase the cathode hydrogen over voltage by specific adsorption thereon, it is advantageous to use mixtures of these and alkali metal or alkaline earth metal salts. It is preferred to use salts having anions whose oxidation potential is higher than that of the chloride ion.

In general, low concentrations of conducting salt, for example of 0.05% to 5% by weight, particularly 0.1 to 1% by weight are used. Owing to these low concentrations, relatively sparingly soluble salts may be used whereas in the prior art methods only a limited number of conducting salts which have a high solubility in the electrolytes can be used. The said sparingly soluble salts, such as sulfates and fluorides, also have the advantage that they are less expensive and/or less apt to give rise to secondary reactions. Perchlorates may be used in the said concentrations without risk.

The conventional pH range of 5 to 10, advantageously 6 to 9, is used. Control of the pH value may be carried out by adding, for example, amines, quaternary ammonium bases, weak acids or buffer substances, particularly weakly basic substances or weakly acid substances whose cations are not discharged until high discharge potentials are reached, such as tetraalkyl ammonium phosphates, acid alkyl ammonium sulfates, tetraalkyl ammonium hydroxides or alkylaryl ammonium hydroxides. Tertiary amines or cyclic secondary amines, such as piperazine and morpholine, are very suitable. During the reaction the pH value slowly shifts to lower values. If necessary the pH value may be kept constant during the reaction by metering in small amounts of bases.

The reaction is in general carried out without further solvents or diluents but it is sometimes advantageous to coemploy polar solvents to set up a specific concentration of acrylonitrile or of water in the reaction mixture. Examples of suitable solvents are acetonitrile, dioxane, tetrahydrofuran, N-methylformamide, dimethylformamide and lower alcohols, such as methanol, ethanol and isopropanol. The solvent content of the electrolytes, when solvents are coemployed, is in general 2 to 30% by weight.

It is advantageous to add to the reaction mixture small amounts of a substance which is more readily oxidizable anodically than the conducting salt, acrylonitrile or adiponitrile. The secondary reaction of anodic oxidation of the starting materials or reaction products which results in loss of yield is thus suppressed. Examples of suitable substances are lower alcohols, lower aldehydes, hydroxylamine and particularly methanol and isopropanol. The substance is added to the reaction mixture advantageously in amounts of 5 to 30% by weight. If the whole of the oxygen normally formed during the reaction is to be used up for oxidation of the methanol, about 100 g. of methanol is required per kg. of adiponitrile.

Liquid-permeable electrodes are used for the new process, for example in the form of wire cloth, sieves, expanded metal, sintered articles or in some other liquid-permeable form. It is preferred to use fine-meshed wire cloth having for example 50 to 2000 meshes per square centimeter. The electrodes are usually spaced apart by 0.02 to 1 mm., preferably less than 0.5 mm., particularly 0.05 to 0.2 mm. This small distance may be easily maintained accurately by separating the electrodes by means of a liquid-permeable insulator. Examples of suitable insulators are those of paper, glass fiber cloth, non-woven glass fiber cloth, porous plastic sheeting or ceramics. Supply of current may be effected by clamps at the edge of the electrode or via a wide-meshed wire cloth arranged on the electrode and consisting of the same material. The new process does not differ from the prior art methods as regards electrode material. Cathodes having a high hydrogen overvoltage are used, for example of brass coated with lead or cadmium, of copper coated with lead-thallium alloys, which may be amalgamated, or of amalgamated silver.

The anode material should as far as possible be insoluble and resistant to corrosion. For example anodes of platinum, platinum-iridium, platinum-rhodium or plastinized titanium or tantalum, nickel wire cloth coated with lead dioxide or thallium oxide, or titanium wire cloth having a coating of titanium carbide or titanium nitride may be used. For continuous operation, arrangements having a plurality of pairs of electrodes, for example two to one hundred pairs, are particularly suitable.

Current densities of 1 to 200, preferably 5 to 50, amperes per sq. dm. are in general used at cell voltages in the range of 4.5 to 15 volts.

The reaction is usually carried out at atmospheric pressure and at temperatures of from 0° to 50° C., particularly from 25° to 35° C.

In carrying out the process, the pair of electrodes is disposed so that the electrolyte flows therethrough transversely, preferably perpendicularly or substantially perpendicularly to the macroscopic electrode surface. The angle between the macroscopic surface and the direction of flow is preferably 90° but may deviate from this value without however exceeding ±30°. The speed at which the electrolyte flows through the pair of electrodes may vary within wide limits. In general speeds of from 1 to 1000 cm./sec., particularly from 1 to 100 cm./sec., are chosen, i.e. at a speed of a cm./sec., a ccm. of electrolyte flows per second through each 1 sq. cm. of the macroscopic surface of the electrode. When the flow is not uniform, but intermittent, e.g. pulsating, the mean value of the absolute speeds is taken as the speed. The pairs of electrodes may occupy any position, for example a horizontal or vertical position. The term macroscopic surface is defined as that surface of the electrode which, when the electrode body is viewed as a whole, appears as the surface of the shape of for example the wire cloth, sieve or sintered material. The fine structure of the surface is disregarded in the term macroscopic surface.

Electrolytic cells having one or more than one pair of electrodes may be used, and they may be operated batchwise or continuously. In batch operation the reaction mixture may for example be allowed to flow uniformly or intermittently through the pair of electrodes until the desired conversion has been achieved, if desired while cooling and separating gases formed, such as oxygen and hydrogen. In continuous operation, the electrolyte may for example be pumped through a series of pairs of electrodes, starting material being passed through the first pair of electrodes. After the reaction mixture has flowed through the last pairs of electrodes, part or the whole of it is supplied to further processing. Any remainder is combined with the starting mixture. Cooling zones may be interposed between individual pairs of electrodes if necessary. Electrolysis is interrupted advantageously when a conversion of from 10 to 60%, preferably from 15 to 30% has been achieved in order to avoid loss of product owing to anodic oxidation.

Pulsating flow of the electrolyte through the pairs of electrodes may be achieved by a pulsating movement of the electrolyte or by keeping the electrolyte stationary and imparting a pulsating movement to the pairs of electrodes. The frequency of the pulsations may vary within wide limits and in general amounts of 1 to 1000, preferably 10 to 100, cycles per second and the amplitude of the pulsations is in general 0.1 to 3 mm., particularly 0.3 to 1.5 mm.

The reaction mixture may be processed in a conventional manner, for example by selective extraction of the organic substances with a suitable solvent or by extraction of the conducting salt from the reaction mixture with water, followed by fractional distillation of the organic phase. Owing to the small salt content of the electrolytes, processing may be carried out much more simply than in the prior art methods, because the reaction mixture can be distilled without previous separation of the conducting salt. The conducting salt may be recovered from the distillation residue or from the aqueous solutions in the conventional manner.

The invention will be further described in the following examples.

EXAMPLE 1

The apparatus used is shown diagrammatically in the accompanying drawing. Inside an electrolytic cell 1 of polyethylene a cathode consisting of an amalgamated silver wire cloth 2 having 200 meshes per sq. cm. and a wire thickness of 0.33 mm. is disposed horizontally, and below it, at a distance of only 0.1 mm., a wire cloth anode is provided which consists of an alloy of 90% of platinum and 10% of rhodium 3 having 1024 meshes per sq. cm. and a wire thickness of 0.06 mm. Coarse-pored glass fiber paper serves as an intermediate insulating layer 4. Electrical connections to the two wire cloth electrodes are made by annular contacts.

At the beginning of the electrolysis, 420 g. of a mixture of 95% of acrylonitrile, 4.5% of water and 0.5% of tetraethyl ammonium ethyl sulfate is placed in the cell. A stable pH value of 8 is maintained during the electrolysis by the gradual addition of 0.7 g. of glacial acetic acid and 2 g. of triethylamine by means of a dropping funnel 5. The reaction mixture is pumped upwardly through the double wire cloth arrangement by means of a centrifugal pump 6. Oxygen which is disengaged at the anode in practically a quantitative yield escapes into a gas separator 7 and out of the system through a reflux condenser 8 which is cooled with brine. A pH meter 9, a temperature measuring means 10 and a heat exchanger 11 are provided in the pump circuit. The cell may be emptied through a cock 12.

Electrolysis is carried out at a current strength of 4.5 amperes, equivalent to a current density of 15 amperes per square decimeter. The cell voltage is 5 to 7 volts. After 7.5 hours, corresponding to a theoretical current conversion of 16% with respect to acrylonitrile, the mixture is worked up by distillation. The following material yields are obtained on reacted acrylonitrile: AN (adiponitrile) 48.3%, PN (propionitrile) 27.7%, CEE (bis-β-cyanoethyl ether) 2.7%, SN (succinonitrile) 4.2% and residue 16.6%. The current yields are 45% in respect of AN and 51% in respect of PN.

If the same experiment be carried out with the wire cloth arrangement reversed (i.e. with the cathode underneath) the following materials yields are obtained: 59.5% of AN, 11.1% of PN, 3.2% of CEE, 5.9% of SN and 20.3% of residue. The current yields are 62% on AN and 23% on PN. When following this procedure, the cell voltage at the same current density is 16 to 20 volts.

An experiment carried out at a current density of 20 amps per sq. dm. gives similar results. The cell voltage is only 7 to 9 volts when the cathode is arranged at the top.

EXAMPLE 2

A perforated amalgamated lead sheet (thickness 1 mm., ten holes, each of 2 mm. diameter, in each sq. cm.) is used instead of the amalgamated silver wire cloth in the electrolytic cell described in Example 1. At the beginning of the electrolysis, 450 g. of reaction mixture consisting of 95.5% of acrylonitrile, 4% of water and an 0.5% of tetraethyl ammonium ethyl sulfate is poured into the cell. Electrolysis is carried out at a current strength of 6 amps, equivalent to a current density of 20 amps per sq. dm. (as in Example 1) and a pH value of 7. The cell is 10 volts. After seven hours, equivalent to 10.3% of the theoretical current conversion, the electrolysis is discontinued. The product of electrolysis is worked up by washing with 100 ml. of water followed by fractional distillation of the organic phase. The following yields, on the acrylonitrile reacted, are obtained: 54.8% of AN, 26.4% of PN, 3.4% of CEE, 1.4% of SN and 14.0% of residue. Current yields are 52.4% in respect of AN and 45.0% in respect of PN.

EXAMPLE 3

420 g. of a mixture consisting of 83.5% by weight of acrylonitrile, 10% by weight of methanol, 6% by weight of water and 0.5% by weight of tetraethyl ammonium ethyl sulfate is poured into the electrolytic cell described in Example 1. Electrolysis is carried out at a current strength of 6 amps, equivalent to a current density of 20 amps./sq. dm., at 25° C. and a pH value of 7. The cell voltage is 10.5 volts. 3.5 g. of triethylamine is added to regulate the pH value during the electrolysis. After 6.42 hours, equivalent to a theoretical current conversion of 21.6%, the electrolysis is discontinued. The product of electrolysis is worked up by washing with 50 ml. of water followed by fractional distillation of the organic phase. The following yields, on reacted acrylonitrile, are obtained: 66.7% of AN, 6.8% of PN, 0.5% of SN, 25.2% of residue and 0.8% of other components. Current yields are 70.0% in respect of AN and 15.0% in respect of PN.

EXAMPLE 4

A pair of electrodes is disposed horizontally in a glass electrolytic cell provided with a polyethylene cover. The electrodes consist of a circular cathode wire cloth (brass wire cloth having 1500 meshes per sq. cm. amalgamated and provided with a galvanicially deposited layer of lead having a thickness of 30 microns) and an anode wire cloth of the same size (platinum-rhodium (90/10) alloy, 1024 meshes per sq. cm.) and are separated and insulated from each other by a coarse-pored glass fiber paper having a thickness of 0.1 mm. Both wire cloths are pressed together by two polypropylene members having the shape of spoked wheels and secured at the lower end of a vibrator shaft.

The wire cloths are connected with electric leads. The vibrator axis, which is mounted on a 40 watt vibrator having a frequency of 100 cycle per second, is passed into the cell by means of a rubber membrane so that no gas can escape. The apparatus is also provided with a glass electrode, a thermometer, a dropping funnel and an off-gas pipe through a reflux condenser. The cell is stood in a bath of flowing tap water for cooling.

500 g. of a mixture containing 66% by weight of acrylonitrile, 20% by weight of dioxane, 8% by weight of water, 5% by weight of methanol and 1% by weight of tetramethyl ammonium methyl sulfate is placed in the cell at the beginning of the electrolysis. The vibrator is operated at an amplitude of 0.5 mm. A stable pH value of 8.2 is maintained by gradual addition of 0.5 g. of glacial acetic acid and 1.5 g. of triethylamine.

Electrolysis is carried out at a current strength of 6.0 amps, equivalent to a current density of 25 amps per sq. dm. with reference to an uncovered wire cloth surface of 24 sq. cm. The pH value is kept constant during the electrolysis by adding a total of 8 g. of triethylamine. The temperature is 25° C. The cell voltage at the beginnig of the electrolysis is 7.5 volts, after one hour 7.5 volts, after two hours 7.4 volts, after three hours 7.4 volts and after three hour thirty minutes 7.4 volts. Electrolysis for three hours thirty minutes is equivalent to a theoretical conversion of 12.5% on the acrylonitrile used.

The reaction mixture is worked up by washing with 100 g. of water and fractional distillation of the organic phase.

The yields with reference to acrylonitrile reacted are: 62.3% of AN, 11.8% of PN and 13.6% of residue. The current yields are 62% on AN and 24% on PN.

If the same experiment be carried out at a pH value of 7.3, the yields are 61.2% of AN, 13.8% of PN and 15.6% of residue. The current yield is 61% as regards AN and 27% as regards PN.

EXAMPLE 5

400 g. of a mixture of 72.5% by weight of acrylonitrile, 20% by weight of isopropanol, 7% by weight of water and 0.5% by weight of tetramethyl ammonium methyl sulfate is placed in an electrolytic cell as described in Example 4 in which a platinum-rhodium wire cloth coated with a layer of β-lead oxide having a thickness of 24 microns is used as anode. Electrolysis is carried out at a current strength of 6 amps, equivalent to a current density of 20 amps per sq. dm., at 30° C. and at pH 8.5. The pH value is kept constant by adding 9 g. of 2.6-molar aqueous solution of tetraethyl ammonium hydroxide during the electrolysis. The cell voltage is 5.9 to 6.1 volts. Electrolysis is discontinued after 4.90 hours, equivalent to a theoretical current conversion of 20.0%. The product is worked up as in Example 4. The following yields are obtained with reference to the reacted acrylonitrile by working up as described in Example 4: 78.0% of AN, 1.7% of PN and 15.7% of residue. The current yields are 87% as regards AN and 4% as regards PN. The anode coated with lead dioxide is unchanged after the experiment.

EXAMPLE 6

The procedure of Example 1 is followed except that no recirculating pump is used to convey the reaction mixture through the electrodes. Instead of this a piston is provided in the lower part of the electrolytic cell; this piston is capable of moving in a cylinder with which it makes a liquid-tight fit. The frequency of the pulsating movement of the piston, which is transmitted to the electrolyte, is 20 cycles per second. The amplitude of the liquid pulsation at the pair of electrodes is 3 mm. Under the reaction conditions described in Example 1, identical current yields and product yields are obtained with the new arrangement.

What we claim is:

1. In a process for the electrochemical hydrodimerization of acrylonitrile into adiponitrile by electrolyzing a liquid reaction mixture containing acrylonitrile, water and a conducting salt, the improvement which comprises passing said liquid reaction mixture in transverse flow through the macroscopic surfaces of at least one pair of liquid permeable electrodes consisting of anode and cathode members spaced a short distance apart, said reaction mixture flowing in the same direction through both the cathode and anode members of each pair of electrodes.

2. A process as claimed in claim 1 wherein the anode and cathode members of each pair of electrodes are spaced apart at a distance of approximately 0.02 to 1 mm. with reference to their opposing macroscopic surfaces.

3. A process as claimed in claim 1 wherein the anode and cathode members of each pair of electrodes are separated from each other and maintained in parallel relationship by a liquid-permeable insulator.

4. A process as claimed in claim 3 wherein the anode and cathode members of each pair of electrodes are spaced apart at a distance of approximately 0.02 to 1 mm. with reference to their opposing macroscopic surfaces.

5. A process as claimed in claim 1 wherein a pulsating movement is imparted to the liquid reaction mixture as it flows through the electrodes.

6. A process as claimed in claim 1 wherein the liquid reaction mixture has a conducting salt concentration of less than 5% by weight.

7. A process as claimed in claim 1 wherein at least one of said anode and cathode members is composed of a fine-mesh wire cloth.

8. A process as claimed in claim 1 wherein the liquid reaction mixture is passed through said electrodes at a speed of about 1 to 1,000 cm./sec.

9. A process as claimed in claim 5 wherein the liquid reaction mixture is passed through said electrodes at a speed having a mean value of about 1 to 100 cm./sec.

References Cited

UNITED STATES PATENTS

| | | | |
|---|---|---|---|
| 1,513,728 | 11/1924 | Allan | 204—284 |
| 1,776,787 | 9/1930 | Ergang | 204—284 |
| 3,193,481 | 7/1965 | Baizer | 204—73 |

FOREIGN PATENTS

| | | |
|---|---|---|
| 895,761 | 9/1953 | Germany. |
| 1,168,651 | 4/1964 | Germany. |
| 9,319 | 6/1892 | Great Britain. |
| 907,351 | 10/1962 | Great Britain. |

JOHN H. MACK, Primary Examiner

H. M. FLOURNOY, Assistant Examiner